US008644400B2

(12) United States Patent
Noh et al.

(10) Patent No.: US 8,644,400 B2
(45) Date of Patent: Feb. 4, 2014

(54) APPARATUS AND METHOD FOR OPERATING VALID BIT IN A WIRELESS COMMUNICATION SYSTEM

(75) Inventors: Si-Woo Noh, Namwon-si (KR); Young-Seok Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 745 days.

(21) Appl. No.: 12/498,174

(22) Filed: Jul. 6, 2009

(65) Prior Publication Data

US 2010/0002791 A1  Jan. 7, 2010

(30) Foreign Application Priority Data

Jul. 7, 2008 (KR) .................. 10-2008-0065638

(51) Int. Cl.
*H04K 1/10* (2006.01)
*H04L 27/28* (2006.01)

(52) U.S. Cl.
USPC ........................................................ 375/260

(58) Field of Classification Search
USPC .......... 375/211, 260, 341, 345, 346; 714/790, 714/758, 763
See application file for complete search history.

(56) References Cited

U.S. PATENT DOCUMENTS

| | | | | |
|---|---|---|---|---|
| 4,289,934 A * | 9/1981 | Pitroda et al. | ................. | 379/269 |
| 4,785,464 A * | 11/1988 | Judeinstein et al. | .......... | 375/211 |
| 5,706,283 A * | 1/1998 | Suzuki | ........... | 370/311 |
| 2003/0156603 A1 * | 8/2003 | Rakib et al. | .................... | 370/485 |
| 2004/0071231 A1 * | 4/2004 | Lin et al. | ........................ | 375/341 |
| 2005/0227725 A1 * | 10/2005 | Rimi et al. | ..................... | 455/525 |
| 2006/0090120 A1 * | 4/2006 | Chen | .............................. | 714/790 |
| 2009/0245431 A1 * | 10/2009 | Challa et al. | .................. | 375/340 |
| 2010/0077265 A1 * | 3/2010 | Wei et al. | ...................... | 714/701 |

* cited by examiner

*Primary Examiner* — Sam K Ahn
*Assistant Examiner* — Syed Haider
(74) *Attorney, Agent, or Firm* — Jefferson IP Law, LLP

(57) ABSTRACT

An apparatus and method for processing a valid bit operation in a wireless communication system are provided. The method includes analyzing input data and generating valid bit information representing a start position of valid bits, generating operation data comprised of the valid bits and valid bit information by eliminating extra bits from the input data, and, after performing an operation process using the generated operation data, restoring the operation data to data that is the same data as the input data.

15 Claims, 7 Drawing Sheets

| x[11] | x[10] | x[9] | x[8] | x[7] | s[2] | s[1] | s[0] |
|---|---|---|---|---|---|---|---|
| 0 | 0 | 0 | 0 | 0 | 1 | 0 | 0 |
| 0 | 0 | 0 | 0 | 1 | 0 | 1 | 1 |
| 0 | 0 | 0 | 1 | X | 0 | 1 | 0 |
| 0 | 0 | 1 | X | X | 0 | 0 | 1 |
| 0 | 1 | X | X | X | 0 | 0 | 0 |

| s[15] | s[14] | s[13] | s[12] | x[11] | x[10] | x[9] | x[8] | x[7] | x[3] | s[2] | s[1] | s[0] |
|---|---|---|---|---|---|---|---|---|---|---|---|---|
| 0 | 0 | 0 | 0 | 0 | 0 | 0 | 0 | 0 | 1 | 0 | 0 | 0 |
| 0 | 0 | 0 | 0 | 0 | 0 | 0 | 0 | 1 | 0 | 1 | 1 | 1 |
| 0 | 0 | 0 | 0 | 0 | 0 | 0 | 1 | X | 0 | 1 | 1 | 0 |
| 0 | 0 | 0 | 0 | 0 | 0 | 1 | X | X | 0 | 1 | 0 | 1 |
| 0 | 0 | 0 | 0 | 0 | 1 | X | X | X | 0 | 1 | 0 | 0 |
| 0 | 0 | 0 | 0 | 1 | X | X | X | X | 0 | 0 | 1 | 1 |
| 0 | 0 | 0 | 1 | X | X | X | X | X | 0 | 0 | 1 | 0 |
| 0 | 0 | 1 | X | X | X | X | X | X | 0 | 0 | 0 | 1 |
| 0 | 1 | X | X | X | X | X | X | X | 0 | 0 | 0 | 0 |

APPARATUS AND METHOD FOR OPERATING VALID BIT IN A WIRELESS COMMUNICATION SYSTEM

PRIORITY

This application claims the benefit under 35 U.S.C. §119 (a) of a Korean patent application filed in the Korean Intellectual Property Office on Jul. 7, 2008 and assigned Serial No. 10-2008-0065638, the entire disclosure of which is hereby incorporated by reference.

BACKGROUND OF THE INVENTION

1. Field of the Invention

The present invention relates to an operating apparatus of a wireless communication system. More particularly, the present invention relates to an apparatus and method for, if an amount of data from a channel is large, reproducing data comprised of only the minimum amount of valid data from among input data to reduce a buffer size and a hardware design cost, and performing operation processing.

2. Description of the Related Art

A wireless communication system changes a modulation order and an error correction code adaptively to a channel between transmit/receive ends through an Adaptive Modulation and Coding (AMC) technique, thereby promoting an increase in frequency efficiency.

In addition, the wireless communication system promotes an improvement of system throughput by allocating a channel to a Mobile Station (MS), in consideration of channel states between a Base Station (BS) and MSs, through scheduling. For this, there is a need to forward Channel Quality Information (CQI) estimated at a receive end, to a transmit end.

On the other hand, Orthogonal Frequency Division Multiple Access (OFDMA) utilizes a characteristic of a frequency selective channel and applies the AMC and scheduling for each subband. Here, the subband generally represents a unit in which a channel quality characteristic is maintained. In this case, because CQI for each subband has to be forwarded from a receive end to a transmit end, a signaling overhead for CQI forwarding increases and thus, wastes channel resources. In addition, a size of a buffer, used for storing data channel-estimated before performing the CQI, increases.

For example, if each 'I' data and 'Q' data, which are output data of a channel estimator, is 12 bits, the combined 'I' data and 'Q' data output through a multiplexer is 24 bits.

At this time, in the case of a 4×2 Multiple Input Multiple Output (MIMO) system, the size of the buffer storing data channel-estimated before performing the CQI is equal to 196608 bits. A channel value must always be maintained and therefore the buffer size is larger than a case of a 2×2 MIMO system.

However, the input data becomes 24 bits multiplexed through two inputs of 12 bits. 8 bits from among the 12 bits of input data are valid data, and the remaining bits are extra data that are used to prepare for a case where a channel change is likely.

Thus, there is a problem that a buffer size of a wireless communication system increases and hardware becomes more complex.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing a buffer size and a hardware design cost that increase according to an amount of data in a channel in a wireless communication system.

Another aspect of the present invention is to provide an apparatus and method for regenerating input data into operation data comprised of the optimal valid data in a wireless communication system.

Still another aspect of the present invention is to provide an apparatus and method for performing operation processing using operation data comprised of the optimal valid data, thus reducing a buffer size in a wireless communication system.

The above aspects are addressed by providing an apparatus and method for operating valid data in a wireless communication system.

In accordance with an aspect of the present invention, an apparatus for processing a valid bit operation in a wireless communication system is provided. The apparatus includes an operation data generator for analyzing input data, for generating valid bit information representing a start position of valid bits, and for generating operation data comprised of the valid bits and valid bit information by eliminating extra bits from the input data, and a data restoration unit for, after performing an operation process using the generated operation data, restoring the operation data to data that is the same as the input data.

In accordance with another aspect of the present invention, a method for processing a valid bit operation in a wireless communication system is provided. The method includes analyzing input data, generating valid bit information representing a start position of valid bits, generating operation data comprised of the valid bits and valid bit information by eliminating extra bits from the input data, and after performing an operation process using the generated operation data, restoring the operation data to data that is the same as the input data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description is made for an apparatus and method for, if an amount of data from a channel of a wireless communication system is large, regenerating data to eliminate bits corresponding to extra data (hereafter referred to as extra bits) from input data comprised of bits corresponding to valid data (hereafter referred to as valid bits) and the extra bits, i.e., data comprised of only a minimal number of valid bits, and performing operation processing. Thereby, the apparatus and method may reduce a buffer size and a hardware design cost. An example of an amount of data from a channel of a wireless communication system that is large is the amount of data corresponding to a Frequency Domain Processing (FDP) region of Long Term Evolution (LTE).

Figure 1:
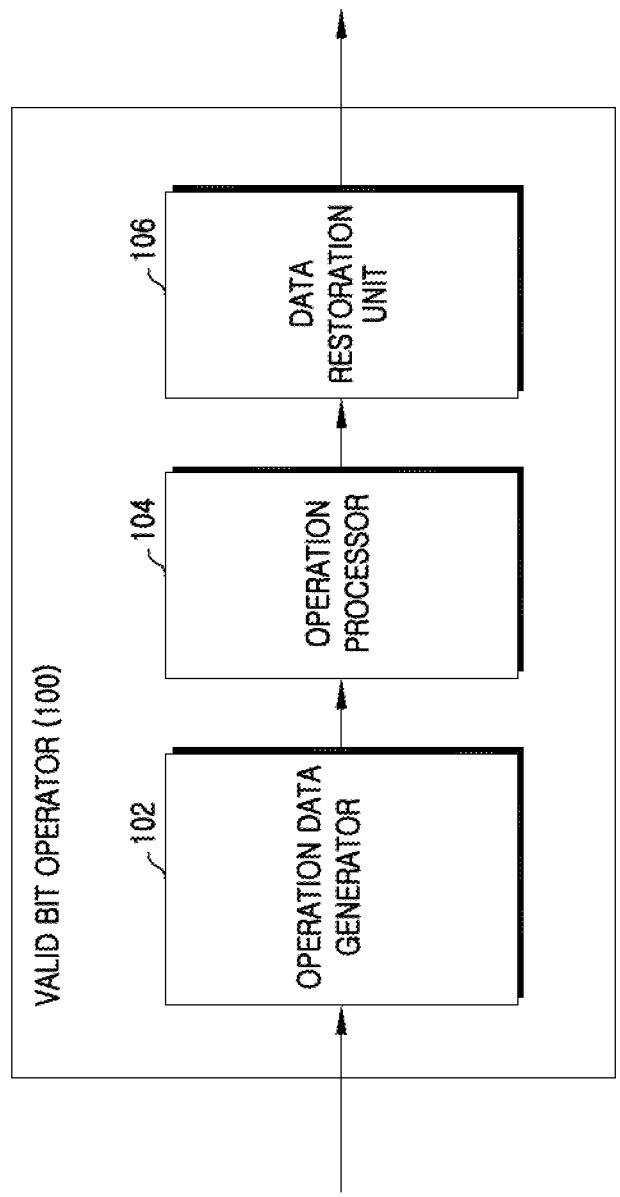
FIG. 1 is a block diagram illustrating a construction of a valid bit operator for determining only valid data in input data and for performing operation processing according to an exemplary embodiment of the present invention.

FIG. 1 is a block diagram illustrating a construction of a valid bit operator for determining only valid data in input data and for performing operation processing according to an exemplary embodiment of the present invention.

Referring to FIG. 1, the valid bit operator 100 may include an operation data generator 102, an operation processor 104, and a data restoration unit 106.

If an amount of a data from a channel is large, in order to reduce a size of a buffer storing channel-estimated data, the valid bit operator 100 processes to generate data comprised of only a minimal number of valid bits by eliminating extra bits from input data comprised of valid bits and the extra bits that are used to prepare for a case in which a channel change is likely. In addition, the valid bit operator 100 operation-processes the generated data and then, processes to restore the operation-processed data into the original data.

The operation data generator 102 of the valid bit operator 100 processes to search input data comprised of valid bits and extra bits for only the valid bits and then generates operation data comprised of valid bit information (i.e., shift information), which is information that identifies a start point of the valid bits, and the found valid bits. That is, the operation data generator 102 generates the operation data comprised of only the minimal number of valid bits by eliminating extra bits from among the input data to reduce an operation process of the valid bit operator 100 and a buffer size of the operator 100.

At this time, the operation data generator 102 generates operation data including a first sign bit (S) that identifies a start of first valid bits and the first valid bits, a second sign bit (S) that identifies a start of second valid bits and the second valid bits, and valid bit information representing a position of the first sign bits. This can reduce an operation process by deleting extra bits from input data of a general channel comprised of first valid bits, first extra bits, and a first sign bit (S), and second valid bits, second extra bits, and a second sign bit (S). For example, if two pieces of input data of 12 bits (i.e., valid data of 8 bits and extra data of 4 bits) are received, the operation data generator 102 generates operation data of a total of 19 bits including 16 valid bits and valid bit information of 3 bits from input data comprising a total of 24 bits.

The operation processor 104 performs an operation process using the operation data. The data restoration unit 106 processes to restore the operation data operation-processed by the operation processor 104 into the same data as the input data. That is, the data restoration unit 106 determines the valid bit information included in the operation data and restores operation data to a size of the initially received input data, i.e., 19 bits into input data of 24 bits.

Functions of the operation data generator 102, the operation processor 104, and the data restoration unit 106 can be implemented by the valid bit operator 100. However, while these are separately constructed and illustrated in an exemplary embodiment of the present invention for convenience of description, the separate construction and illustration is not intended to limit the scope of the present invention. It will be understood by those skilled in the art that various modifications of construction can be made within the scope of the present invention. For example, the valid bit operator 100 may process any number of these functions.

Figure 2:
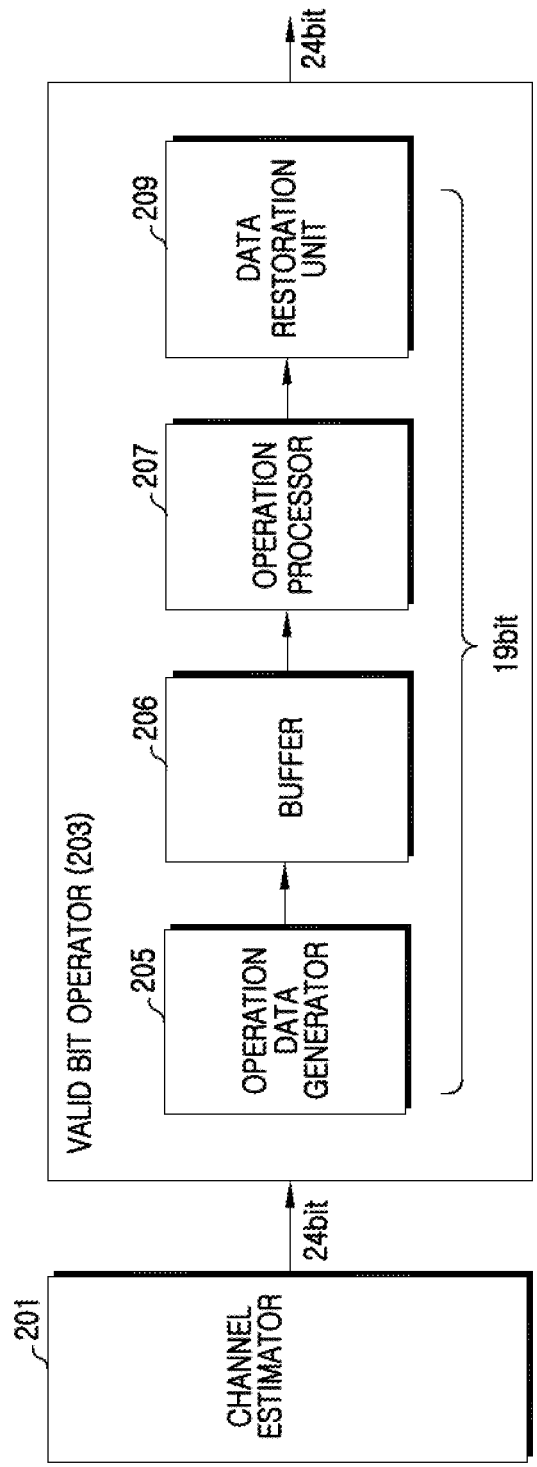
FIG. 2 is a block diagram illustrating a construction of a Channel Quality Information (CQI) operation processing system for performing CQI operation processing using an operation processor according to an exemplary embodiment of the present invention.

FIG. 2 is a block diagram illustrating a construction of a Channel Quality Information (CQI) operation processing system for performing CQI operation processing using an operation processor according to an exemplary embodiment of the present invention.

Referring to FIG. 2, the CQI operation processing system may include a channel estimator 201 and a valid bit operator 203. The valid bit operator 203 may include an operation data generator 205, a buffer 206, an operation processor 207, and a data restoration unit 209.

The channel estimator 201 estimates a channel from a transmit end using input data received through receive antennas and then, provides the received input data to the valid bit operator 203. Accordingly, the valid bit operator 203 processes to generate operation data comprised of only valid bits from input data that is comprised of the valid bits and extra bits, perform an operation processing process, and restore the operation data, by performing the operation processing process, to the same data as the input data.

A more detailed description of an operation process of the valid bit operator is given as follows.

The CQI operation processing system performs an operation of determining a transmit power between the same channels (i.e., control channels (Single Input Single Output (SISO) and Space Frequency Block Coding (SFBC)) and between adjacent channels (Multiple Input Multiple Output Spatial-Multiplexing (MIMO SM) case).

Assuming that 'I' data and 'Q' data of 12 bits are received, i.e., data of a total of 24 bits from the channel estimator 201, the CQI operation processing system processes to allow the operation data generator 205 to generate operation data of 19 bits that includes valid data (16 bits) and valid data information (3 bits) identifying a start point of the valid data among the input data of 24 bits (i.e., a valid bit of 16 bits and an extra bit of 8 bits) and then, processes to store the generated operation data in the buffer 206.

After that, the CQI operation processing system processes to allow the operation processor 207 to perform an operation processing process using operation data stored in the buffer 206. Then, the CQI operation processing system processes to allow the data restoration unit 209 to determine valid bit information included in the operation data and restore the operation data to a size corresponding to the initially received input data, i.e., 19 bits into the input data of 24 bits.

The above description has been made for an apparatus for, if an amount of data from a channel of a wireless communication system is large, in order to reduce a buffer size and a hardware design cost, reproducing data comprised of only the minimal number of valid bits from among input data and performing operation processing. The following description is made for a method for, if an amount of data from a channel of a wireless communication system is large, in order to reduce a buffer size and a hardware design cost, reproducing data comprised of only the minimal number of valid bits from among input data and performing operation processing using the apparatus according to an exemplary embodiment of the present invention.

Figure 3:
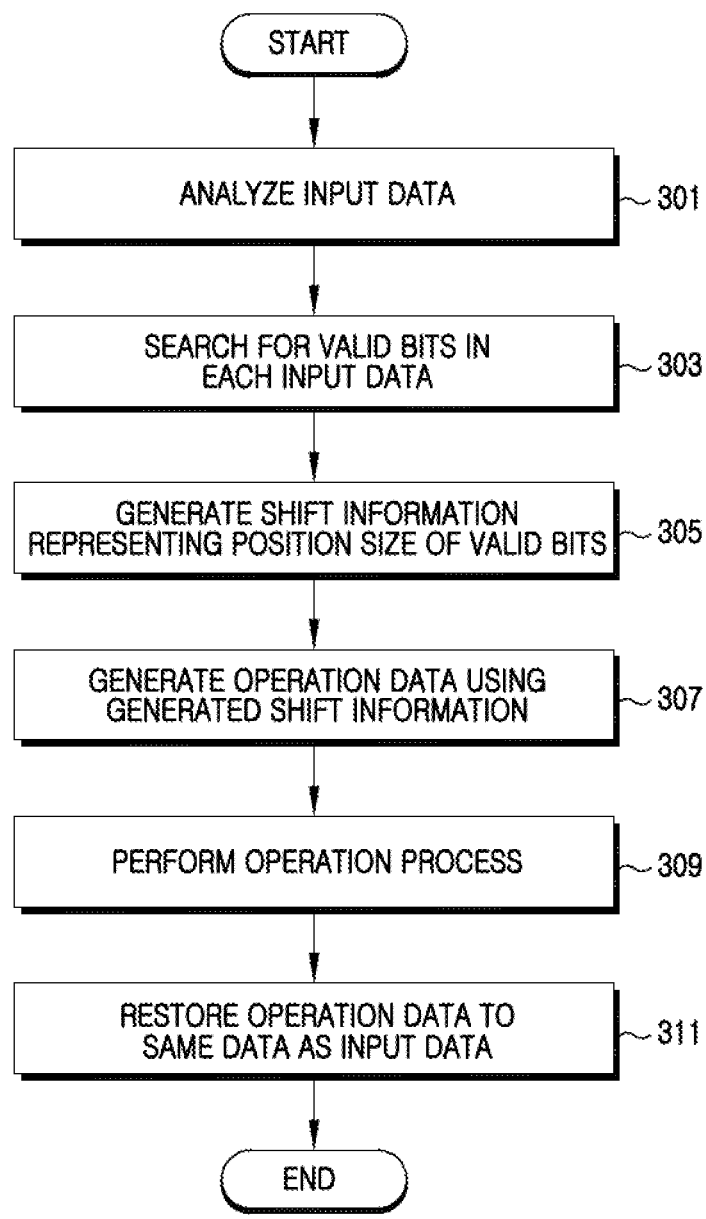
FIG. 3 is a flowchart illustrating a process for generating data comprised of only valid bits in an operation processor according to an exemplary embodiment of the present invention.

FIG. 3 is a flow diagram illustrating a process for generating data comprised of only a valid bit in an operation processor according to an exemplary embodiment of the present invention.

Referring to FIG. 3, in step 301, a valid bit operator analyzes input data.

Here, the input data is an output value of a multiplexer and refers to a channel value input to the valid bit operator. For example, if two inputs of 12 bits go through the multiplexer, the two inputs become input data having a size of 24 bits. Here, each input data whose size is 12 bits is comprised of valid data of 8 bits and extra data of 4 bits. That is, the input data is comprised of a minimum of 8 valid bits and 4 extra bits that are used for considering a change of a channel state.

Then, the valid bit operator proceeds to step 303 and searches valid bits in each input data and then, proceeds to step 305 and generates valid bit information (i.e., shift information) representing a position size of the valid bits. Here, the valid bit operator can search for the valid bits in the input data using the following method.

First, the valid bit operator searching for the valid bits in the input data can search for the valid bits by determining a start point of the bits corresponding to the valid data (hereafter referred to as the valid bit start point) in the input data.

Here, the valid bit operator may determine the valid bit start point of the input data using information defined below in Table 1 and Equation 1.

Table 1 includes valid bit information (i.e., shift information) (s[2], s[1], and s[0]) representing a size and start position of the valid bits included in the input data.

TABLE 1

| X[11] | X[10] | X[9] | X[8] | X[7] | s[2] | s[1] | s[0] |
|---|---|---|---|---|---|---|---|
| 0 | 0 | 0 | 0 | 0 | 1 | 0 | 0 |
| 0 | 0 | 0 | 0 | 1 | 0 | 1 | 1 |
| 0 | 0 | 0 | 1 | x | 0 | 1 | 0 |
| 0 | 0 | 1 | X | x | 0 | 0 | 1 |
| 0 | 1 | x | X | x | 0 | 0 | 0 |

$s[0] == (X[11:9] = 3'b1 || X[11:9] = 3'b110 || X[11:7] = 5'b1 || X[11:7] = 5'b11110)$
$s[1] == (X[11:8] = 4'b1 || X[11:8] = 4'b110 || X[11:7] = 5'b1 || X[11:7] = 5'b11110)$
$s[2] == (X[11:7] = 5'b0 || X[11:7] = 5'b11111) ? 1:0; \ldots (1)$ A process of determining the valid bit start point of the input data in the valid bit operator with reference to Equation 1 and Table 1 is given as follows.

According to Equation 1, the valid bit operator determines a total of five positions corresponding to values from X[11] to X[7] and thus, determines s[0], s[1], and s[2]. For example, if satisfying any one condition among a condition where X[11] is equal to '0', X[10] is equal to '0', and X[9] is equal to '1', a condition where X[11] is equal to '1', X[10] is equal to '1', and X[9] is equal to '0', and a condition where X[11] is equal to '0', X[10] is equal to '0', X[9] is equal to '0', X[8] is equal to '1', and X[7] is equal to '1', and a condition where X[11] is equal to '1', X[10] is equal to '1', X[9] is equal to '1', X[8] is equal to '1', and X[7] is equal to '0', the s[0] becomes '1' and, if satisfying no condition, the s[0] becomes '0'.

In the same manner, if satisfying any one condition from among a condition where X[11] is equal to '0', X[10] is equal to '0', X[9] is equal to '0', and X[8] is equal to '1', a condition where X[11] is equal to '1', X[10] is equal to '1', X[9] is equal to '1', and X[8] is equal to '0', and a condition where X[11] is equal to '0', X[10] is equal to '0', X[9] is equal to '0', X[8] is equal to '0', and X[7] is equal to '1', and a condition where X[11] is equal to '1', X[10] is equal to '1', X[9] is equal to '1', X[8] is equal to '1', and X[7] is equal to '0', the s[1] becomes '1' and, if satisfying no condition, the s[1] becomes '0'.

Also, if satisfying any one condition among a condition where X[11] is equal to '1', X[10] is equal to '1', X[9] is equal to '1', X[8] is equal to '1', and X[7] is equal to '0' and a condition where X[11] is equal to '1', X[10] is equal to '1', X[9] is equal to '1', X[8] is equal to '1', and X[7] is equal to '1', the s[2] becomes '1' and, if satisfying no condition, the s[2] becomes '0'.

Values of the s[0], s[1], and s[2] obtained in the above manner are used as the valid bit information (i.e., shift information) representing the start point of the valid bits from among the input data.

Then, the valid bit operator proceeds to step 307 and generates operation data using the valid bit information (i.e., the shift information) that is information of the start point of the valid bits generated in step 305. The operation data refers to data comprised of only the minimal number of valid bits by eliminating extra bits from among the input data to reduce an operation process of the valid bit operator and a buffer size of the operator. That is, the operation data can include a first sign bit (S) identifying a start of first valid bits and the first valid bits, a second sign bit (S) identifying a start of second valid bits and the second valid bits, and valid bit information representing a position of the first sign bit. This can reduce an operation process by deleting the extra bits from input data of a general channel comprised of first valid bits, first extra bits, and a first sign bit (S), and second valid bits, second extra bits, and a second sign bit (S). For example, if two pieces of input data are received having 12 bits (i.e., valid data of 8 bits and extra data of 4 bits), the valid bit operator generates operation data comprising a total of 19 bits including valid data of 16 bits and extra bit information of 3 bits from the input data including 24 bits.

Then, the valid bit operator proceeds to step 309 and performs an operation process using the operation data generated in step 307 and then, proceeds to step 311 and processes to restore the operation data to the same data as the input data.

The valid bit operator determines valid bit information included in the operation data and restores the operation data to a size corresponding to the initially received input data, i.e., 19 bits into input data of 24 bits.

The valid bit operator then terminates the process.

FIGS. 4A to 4D are diagrams illustrating a process for determining only a valid bit and performing an operation process in a valid bit operator according to an exemplary embodiment of the present invention.

Figures 4A, 4B:
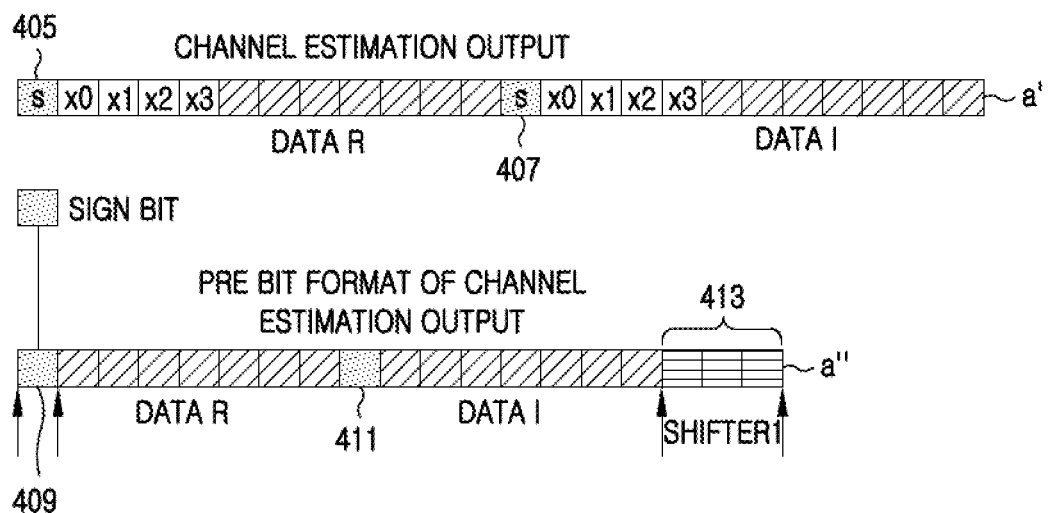
FIG. 4A is a diagram illustrating a process for searching for valid bits in a valid bit operator according to an exemplary embodiment of the present invention.
FIG. 4B is a diagram illustrating a process for generating operation data in a valid bit operator according to an exemplary embodiment of the present invention.

FIG. 4A is a diagram illustrating a process for searching for valid bits in a valid bit operator according to an exemplary embodiment of the present invention.

Referring to FIG. 4A, the valid bit operator determines a valid bit start point to search for valid bits from among the input data.

At this time, as illustrated in the table of FIG. 4A, the valid bit operator may determine a total of five positions corresponding to values 401 from X[11] to X[7] and may determine information (s[2], s[1], and s[0]) 403 that is valid bit information (i.e., shift information) representing a size and start position of the valid bit.

FIG. 4B is a diagram illustrating a process for generating operation data in a valid bit operator according to an exemplary embodiment of the present invention.

Referring to FIG. 4B, the valid bit operator generates operation data (a″) by deleting extra data from input data (a′) of a general channel comprised of first valid bits, first extra bits, and a first sign bit (S) 405 identifying a start of the first valid bits, and second valid bits, second extra bits, and a second sign bit (S) 407 identifying a start of the second valid bits.

Here, the operation data (a″) includes a first sign bit (S) 409 identifying a start of first valid bits and first valid bits, a second sign bit (S) 411 identifying a start of second valid bits and second valid bits, and valid bit information 413 representing a position of the first sign bit 409.

Figures 4C, 4D:
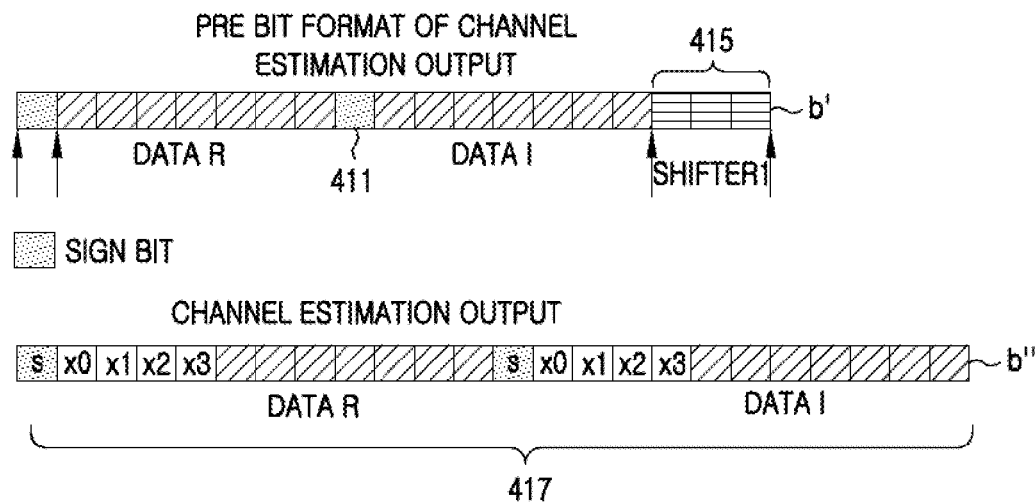
FIG. 4C is a diagram illustrating a process for finding a start point of valid data for restoring operation data in a valid bit operator according to an exemplary embodiment of the present invention.
FIG. 4D is a diagram illustrating a construction of data restoring operation data in a valid bit operator according to an exemplary embodiment of the present invention.

FIG. 4C is a diagram illustrating a process for finding a start point of valid data for restoring operation data in a valid bit operator according to an exemplary embodiment of the present invention.

Referring to FIG. 4C, the valid bit operator determines a total of five positions corresponding to values from X[11] to X[7] and thus, determines s[0], s[1], and s[2]. For example, if satisfying any one condition among a condition where X[11] is equal to '0', X[10] is equal to '0', and X[9] is equal to '1', a condition where X[11] is equal to '1', X[10] is equal to '1', and X[9] is equal to '0', and a condition where X[11] is equal to '0', X[10] is equal to '0', X[9] is equal to '0', X[8] is equal to '0', and X[7] is equal to '1', and a condition where X[11] is equal to '1', X[10] is equal to '1', X[9] is equal to '1', X[8] is equal to '1', and X[7] is equal to '0', the s[0] becomes '1' and, if satisfying no condition, the s[0] becomes '0'. The s[1] and s[2] can be determined using the above manner.

FIG. 4D is a diagram illustrating a construction of data restoring operation data in a valid bit operator according to an exemplary embodiment of the present invention.

Referring to FIG. 4D, the valid bit operator performs an operation process using operation data and then, processes to restore the operation data (b') to the same data (b″) as the input data. Here, the valid bit operator is to determine valid bit information 415 included in the operation data and restore the operation data to a size corresponding to the initially received input data, that is, 19 bits into the input data 417 of 24 bits.

Figure 5A:
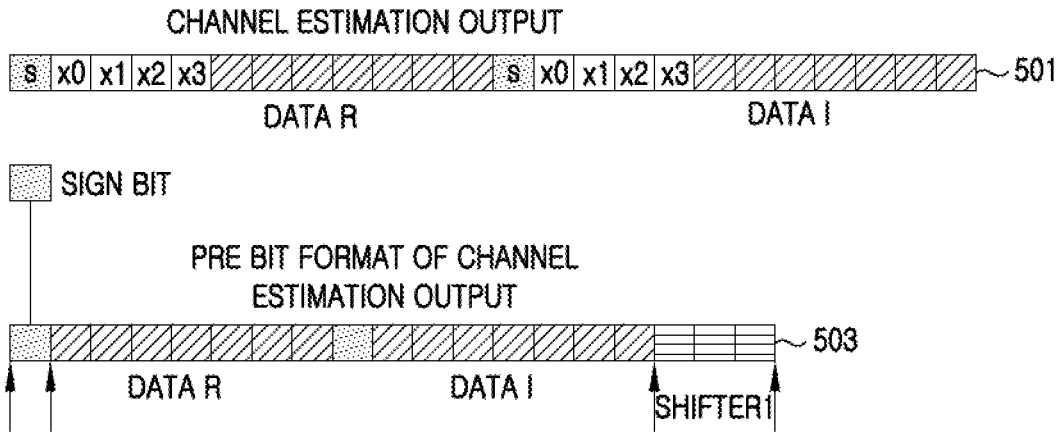
FIG. 5A is a diagram illustrating a process for generating operation data in a valid bit operator according to an exemplary embodiment of the present invention.
Figure 5B:
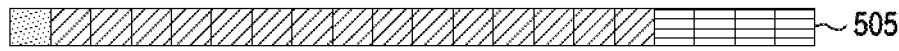
FIG. 5B is a diagram illustrating a process for determining valid bits using a multiplication operation in a valid bit operator according to an exemplary embodiment of the present invention.
Figure 5C:
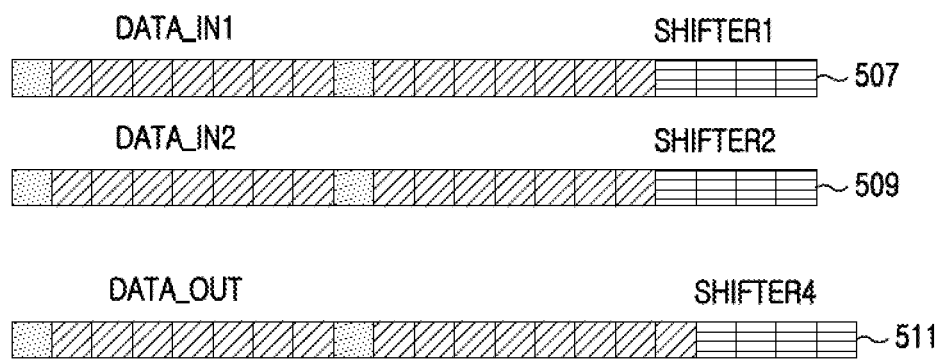
FIG. 5C is a diagram illustrating a process for determining valid bits using an addition operation in a valid bit operator according to an exemplary embodiment of the present invention.

FIGS. 5A to 5C are diagrams illustrating an operation process of a valid bit operator according to an exemplary embodiment of the present invention.

FIG. 5A is a diagram illustrating a process for generating operation data in a valid bit operator according to an exemplary embodiment of the present invention.

Referring to FIG. 5A, the valid bit operator processes to search input data 501 comprised of valid bits and extra bits, for only the valid bits, and generates operation data 503 comprised of valid bit information (i.e., shift information), which is information on a start point of the valid bits, and the found valid bits.

FIG. 5B is a diagram illustrating a process for determining a valid bit using a multiplication operation in a valid bit operator according to an exemplary embodiment of the present invention.

Referring to FIG. 5B, the valid bit operator determines a valid bit by multiplication only between valid bits and multiplication only between valid bits. At this time, the multiplication only between the valid bits is performed by a general multiplication operation of two valid bits (i.e., data 'R' and data 'I' in the operation data 503 of FIG. 5A). Accordingly, a result of the multiplication operation of the valid bit operator becomes twice the length of a valid bit of input data 505.

FIG. 5C is a diagram illustrating a process for determining a valid bit using an addition operation in a valid bit operator according to an exemplary embodiment of the present invention.

Referring to FIG. 5C, the addition operation of the valid bit operator can be comprised of an addition 511 of a result of multiplication between valid bits 507 and 509 and a portion 513 obtaining valid bit information.

Figure 6:
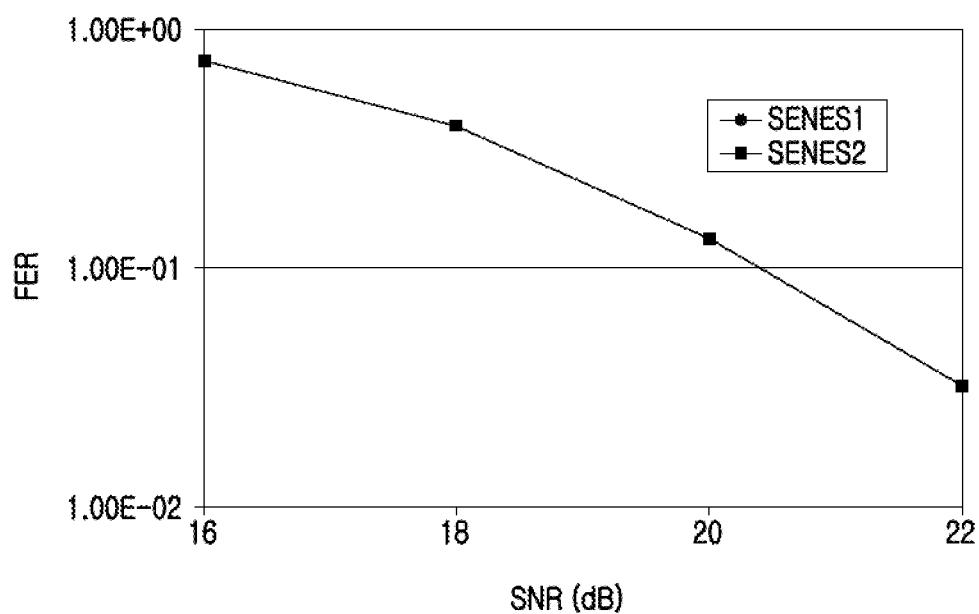
FIG. 6 is a diagram illustrating performance of a valid bit operator according to an exemplary embodiment of the present invention.

FIG. 6 is a diagram illustrating performance of a valid bit operator according to an exemplary embodiment of the present invention.

Referring to FIG. 6, the valid bit operator according to an exemplary embodiment of the present invention maintains the same operation result as a conventional CQI operator when receiving input data of 24 bits and receiving 19-bit input data.

In addition, when comparing the valid bit operator and a conventional CQI operator, there is an effect of addressing a problem of increasing a size of a buffer storing data and a size of a logic circuit (i.e., a gate size).

TABLE 2

| Method | Input bits | Valid bits | Gate size |
|---|---|---|---|
| Conventional operator | Input 1 24 bits<br>Input 2 24 bits | Input 1 13 bits<br>Input 2 13 bits | 7089.09 mm^2<br>(5275 gate) |
| Operator of present invention | Input 1 24 bits<br>Input 2 24 bits | Input 1 13 bits<br>Input 2 13 bits | 2434.32 mm^2<br>(1811 gate) |

Table 2 above represents a table comparing sizes of logic circuits of a valid bit operator according to an exemplary embodiment of the present invention and a conventional CQI operator.

The circuit size of the valid bit operator according to an exemplary embodiment of the present invention is reduced to ⅓ more of the circuit size of the conventional CQI operator.

TABLE 3

| Method | Buffer size | % |
|---|---|---|
| Conventional operator | 24 * 1024 * 8 = 196608 | 100% |
| Operator of present invention | 19 * 1024 * 8 = 155648 | 79.15% |
| Conventional operator | 24 * 1024 * 8 = 196608 | 100% |
| Operator of present invention | 15 * 1024 * 8 = 122880 | 62% |

Table 3 above is a table of comparing buffer sizes of a valid bit operator according to an exemplary embodiment of the present invention and a conventional CQI operator.

Referring to Table 3, it is shown that the buffer size of the valid bit operator according to an exemplary of the present invention may be reduced more than the buffer size of the conventional CQI operator.

As described above, exemplary embodiments of the present invention relate to an apparatus and method for reducing a buffer size and hardware design cost that increase according to an amount of data in a channel in a wireless communication system. Exemplary embodiments of the present invention process to regenerate data comprised of only a minimal number of valid bits from among input data and perform operation processing and thus, if an amount of data from a channel of a wireless communication system is large, the buffer size and hardware design cost can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for processing a channel estimation output in a wireless communication system, the apparatus comprising:
    an operation data generator for receiving a channel estimated data from a channel estimator, the channel estimated data comprising valid bits and extra bits, for searching the valid bits in the channel estimated data and for generating operation data by eliminating the extra bits from the channel estimated data;
    an operation processor for receiving the operation data, performing predetermined operation process for the operation data, and outputting a processed operation data; and
    a data restoration unit for receiving the processed operation data, and restoring the processed operation data to a restored data that has the same size as the channel estimated data,
    wherein the operation data comprises the valid bits, and indication information representing a start position of the valid bits,
    wherein the operation data further comprises a first sign bit identifying a start of first valid bits and the first valid bits, a second sign bit identifying a start of second valid bits and the second valid bits, and the indication information further representing respective start positions of the first valid bits and the second valid bits, and
    wherein the valid bits correspond to Channel Quality Information (CQI) and the extra bits correspond to information on changing a channel.

2. The apparatus of claim 1, further comprising a buffer for storing the operation data.

3. The apparatus of claim 1, wherein the indication information further represents a size of the valid bits.

4. The apparatus of claim 1, wherein the operation data comprises only a minimal number of valid bits.

5. The apparatus of claim 1, wherein the channel estimator is for estimating the channel and outputting the channel estimated data.

6. The apparatus of claim 1, wherein the predetermined operation process comprises a multiplication operation and an addition operation, and the operation processor performs the multiplication operation and the addition operation for the valid bits.

7. The apparatus of claim 6, wherein the operation data generator searches for the valid bits in the channel estimated data using an equation:

$$s[0] == (X[11:9]=3'b1 \| X[11:9]=3'b110 \| X[11:7]=5'b1 \| X[11:7]=5'b11110)$$

$$s[1] == (X[11:8]=4'b1 \| X[11:8]=4'b110 \| X[11:7]=5'b1 \| X[11:7]=5'b11110)$$

$$s[2] == (X[11:7]=5'b0 \| X[11:7]=5'b11111) ? 1:0;$$

where the s[0], s[1], and s[2] comprise the indication information representing the start position of the valid bits, and the X[A:B] comprises an input value of 'A' to 'B' and is defined as:

| x[11] | x[10] | x[9] | x[8] | x[7] | s[2] | s[1] | s[0] |
|---|---|---|---|---|---|---|---|
| 0 | 0 | 0 | 0 | 0 | 1 | 0 | 0 |
| 0 | 0 | 0 | 0 | 1 | 0 | 1 | 1 |
| 0 | 0 | 0 | 1 | x | 0 | 1 | 0 |
| 0 | 0 | 1 | X | x | 0 | 0 | 1 |
| 0 | 1 | x | X | x | 0 | 0 | 0 | where a numeric '1' represents the start position of the valid bits.

8. The apparatus of claim 1, wherein the restored data comprises Channel Quality Information (CQI).

9. A method for processing a channel estimation output in a wireless communication system, the method comprising:
    receiving a channel estimated data from a channel estimator, the channel estimated data comprising valid bits and extra bits;
    searching the valid bits in the channel estimated data;
    generating operation data by eliminating extra bits from the input data; and
    performing predetermined operation process for the operation data to output a processed operation data;
    restoring the processed operation data to a restored data that has the same size as the channel estimated data, wherein the operation data comprises the valid bits, and indication information representing a start position of the valid bits, wherein the operation data further comprises a first sign bit identifying a start of first valid bits and the first valid bits, a second sign bit identifying a start of second valid bits and the second valid bits, and the indication information further representing respective start positions of the first valid bits and the second valid bits, wherein the predetermined operation process comprises a multiplication operation and an addition operation, and wherein the performing of the predetermined operation process performs the multiplication operation and the addition operation for the valid bits, and wherein the valid bits correspond to Channel Quality Information (CQI) and the extra bits correspond to information on changing a channel.

10. The method of claim 9, further comprising storing the operation data in a buffer.

11. The method of claim 9, wherein the indication information further represents a size of the valid bits.

12. The method of claim 9, wherein the operation data comprises only a minimal number of valid bits.

13. The method of claim 9, further comprising estimating the channel, and outputting the channel estimated data.

14. The method of claim 9, wherein the searching of the valid bits in the channel estimated data uses an equation:

$s[0] == (X[11:9]=3'b1 \| X[11:9]=3'b110 \| X[11:7]=5'b1 \| X[11:7]=5'b11110)$ $s[1] == (X[11:8]=4'b1 \| X[11:8]=4'b1110 \| X[11:7]=5'b1 \| X[11:7]=5'b11110)$ $s[2] == (X[11:7]=5'b0 \| X[11:7]=5'b11111)?1:0;$ where the s[0], s[1], and s[2] comprise the indication information representing the start position of the valid bits, and the X[A:B] comprises an input value of 'A' to 'B' and is defined as:

| x[11] | x[10] | x[9] | x[8] | x[7] | s[2] | s[1] | s[0] |
|---|---|---|---|---|---|---|---|
| 0 | 0 | 0 | 0 | 0 | 1 | 0 | 0 |
| 0 | 0 | 0 | 0 | 1 | 0 | 1 | 1 |
| 0 | 0 | 0 | 1 | x | 0 | 1 | 0 |
| 0 | 0 | 1 | X | x | 0 | 0 | 1 |
| 0 | 1 | x | X | x | 0 | 0 | 0 | where a numeric '1' represents the start position of the valid bits.

15. The method of claim 9, wherein the restored data comprises Channel Quality Information (CQI).

* * * * *